(12) United States Patent
Harada et al.

(10) Patent No.: US 7,969,672 B2
(45) Date of Patent: Jun. 28, 2011

(54) LENS DEVICE AND IMAGING DEVICE

(75) Inventors: Kiyoshi Harada, Kanagawa (JP); Shinji Takemoto, Kanagawa (JP); Masahito Kikuchi, Tokyo (JP)

(73) Assignee: Sony Corporation (JP)

( * ) Notice: Subject to any disclaimer, the term of this patent is extended or adjusted under 35 U.S.C. 154(b) by 145 days.

(21) Appl. No.: 12/311,930

(22) PCT Filed: Oct. 4, 2007

(86) PCT No.: PCT/JP2007/069491
§ 371 (c)(1),
(2), (4) Date: Apr. 16, 2009

(87) PCT Pub. No.: WO2008/047612
PCT Pub. Date: Apr. 24, 2008

(65) Prior Publication Data
US 2009/0279192 A1    Nov. 12, 2009

(30) Foreign Application Priority Data

Oct. 17, 2006    (JP) ................................. P2006-282843

(51) Int. Cl.
*G02B 7/02*    (2006.01)
(52) U.S. Cl. ......................................... 359/825; 359/822
(58) Field of Classification Search .................... 359/825
See application file for complete search history.

(56) References Cited

U.S. PATENT DOCUMENTS

| 4,148,562 | A | * | 4/1979 | Sawano ........................ 359/825 |
| 4,272,174 | A | * | 6/1981 | Teramoto et al. ............. 396/137 |
| 4,864,344 | A | * | 9/1989 | Arakawa et al. ............. 396/135 |
| 4,896,951 | A | * | 1/1990 | Atsuta et al. .................. 359/696 |
| 4,963,000 | A |   | 10/1990 | Kawai |
| 5,239,417 | A |   | 8/1993 | Eguchi et al. |

(Continued)

FOREIGN PATENT DOCUMENTS

EP    1804099 A2    7/2007

(Continued)

OTHER PUBLICATIONS

Supplementary European Search Report, EP 0782922, dated Oct. 19, 2010.

*Primary Examiner* — Jessica T Stultz
(74) *Attorney, Agent, or Firm* — Lerner, David, Littenberg, Krumholz & Mentlik, LLP

(57) ABSTRACT

It is intended to carry out a focusing operation suitably in each case of automatic focusing and manual focus adjustment. Therefore, in the present invention, there is provided a first focus ring 1 movable between a first position and a second position on an optical axis. Further, a first rotation-angle detection unit detecting a rotation amount of the first focus ring 1 at the first position, a second focus ring 2 coupled to the first focus ring 1 when the first focus ring 1 is at the first position, and a second rotation-angle detection unit detecting a rotation amount of the second focus ring 2 are provided. When the first focus ring 1 is at the first position, a focus lens is driven based on the rotation amount detected by the first rotation-angle detection unit, and when the first focus ring 1 is at the second position, the focus lens is driven based on the rotation amount detected by the second rotation-angle detection unit.

10 Claims, 5 Drawing Sheets

U.S. PATENT DOCUMENTS

| | | |
|---|---|---|
| 5,969,889 A | 10/1999 | Iikawa et al. |
| 6,160,607 A * | 12/2000 | Diaconu ................ 352/140 |
| 6,580,571 B2 * | 6/2003 | Sasaki et al. ............ 359/823 |
| 6,788,890 B2 | 9/2004 | Suzuki |
| 2007/0147818 A1 | 6/2007 | Mori |

FOREIGN PATENT DOCUMENTS

| | | |
|---|---|---|
| JP | 01-251007 A | 10/1989 |
| JP | 06-011643 A | 1/1994 |
| JP | 06-069923 A | 3/1994 |
| JP | 08-146282 A | 6/1996 |
| JP | 11-023948 A | 1/1999 |
| JP | 11-202400 A | 7/1999 |
| JP | 2004-138770 | 5/2004 |
| JP | 2007-178633 A | 7/2007 |

* cited by examiner

US 7,969,672 B2

LENS DEVICE AND IMAGING DEVICE

CROSS-REFERENCES TO RELATED APPLICATIONS

The present application is a national phase entry under 35 U.S.C. §371 of International Application No. PCT/JP2007/069491 filed Oct. 4, 2007, published on Apr. 24, 2008 as WO 2008/047612 A1, which claims priority from Japanese Patent Application No. JP 2006-282843 filed in the Japanese Patent Office on Oct. 17, 2006.

TECHNICAL FIELD

The present invention relates to a lens device including a focus ring which drives a focus lens, and an imaging device including the lens device.

BACKGROUND ART

In the past, in a video camera capable of carrying out comparatively advanced operations for business purposes or the like, a lens housing is provided with a focus ring for moving the position of a focus lens. The focus ring is rotated manually to adjust focus as needed, and the focus lens can be moved forward and backward along an optical axis based on a rotation amount of the focus ring.

In this case, the focus ring does not directly, mechanically work with a focus lens driving mechanism. The rotation amount of the focus ring is electrically detected to drive a motor, thereby moving the lens through the focus lens driving mechanism. That is, there is provided an encoder that detects the rotation amount of the focus ring, and the rotation amount detected by the encoder is changed into a signal and transmitted to the motor to drive the focus lens via the motor. Hence, the focus ring may not have a fixed end and can be endlessly rotated in either of clockwise and counterclockwise directions without restriction. With a structure that is not provided with such fixed end, for example, while automatically carrying out a focus adjustment with an autofocus function, a focus-adjusted state can be corrected in a simplified manner by manually rotating the focus ring without limitation.

For example, in Japanese Unexamined Patent Application Publication No. H8-146282 published by the Japan Patent Office, there is a disclosure of a focus ring uncoupled from a scale ring at automatic focusing to prevent the focus ring from being rotated.

In the case of a structure having no fixed end on the focus ring, there is an advantage in that focus correction can be comparatively easily carried out at automatic focusing, however, it has been required to confirm a degree of focused state in the automatic focusing on a display of a finder. In the case of a lens of a type having a focus ring with a fixed end, a rotated position of the focus ring corresponds to a focus-adjusted state (focal distance) and accordingly adjustment in manual operation can be carried out easily, however, the focus ring with the fixed end should be rotated in agreement with the focus-adjusted state at automatic focusing and therefore, there is a problem that a mechanism of rotating the focus ring is complicated.

In addition, in the case of using an autofocus function, there is a limitation in rotational speed of a motor and therefore, there is a difficulty in focusing at a speed higher than the rotational speed of the motor.

The present invention has been made in view of the above and intends to perform a suitable operation both at automatic focusing and at manual focus adjustment.

DISCLOSURE OF INVENTION

According to the present invention, a focus lens, a driving unit that drives the focus lens, and a first focus ring movable between a first position and a second position on an optical axis are included. A rotation range of the first focus ring is prevented from being restricted when it is located at the first position. A rotation amount of the first focus ring when it is located at the first position is detected by a first rotation-angle detection unit. In addition, there is provided a second focus ring coupled with the first focus ring when the first focus ring is located at the second position. A rotation range of the second focus ring is restricted corresponding to an adjustable range of the focus lens. A rotation amount of the second focus ring is detected by a second rotation-angle detection unit. When the first focus ring is located at the first position, a control signal is generated based on the rotation amount detected by the first rotation-angle detection unit and is supplied to the driving unit, and when the first focus ring is located at the second position, a control signal is generated based on the rotation amount detected by the second rotation-angle detection unit and is supplied to the driving unit.

Accordingly, when the first focus ring is at the first position, the focus lens is driven in response to the rotation amount of the first focus ring with no fixed end, and when the first focus ring is at the second position, the first focus ring is in a state of having a fixed end and the focus lens is driven based on a rotated position thereof.

According to the present invention, both the focus adjustment in the absence of the fixed end and the focus adjustment in the presence of the fixed end can be easily carried out by switching the positions of the first focus ring, thereby allowing quick focus adjustment to be realized by switching between two modes in response to the situation.

BEST MODE FOR CARRYING OUT THE INVENTION

Hereinafter, an embodiment of the present invention is described with reference to FIGS. 1 to 5.

Figure 1:
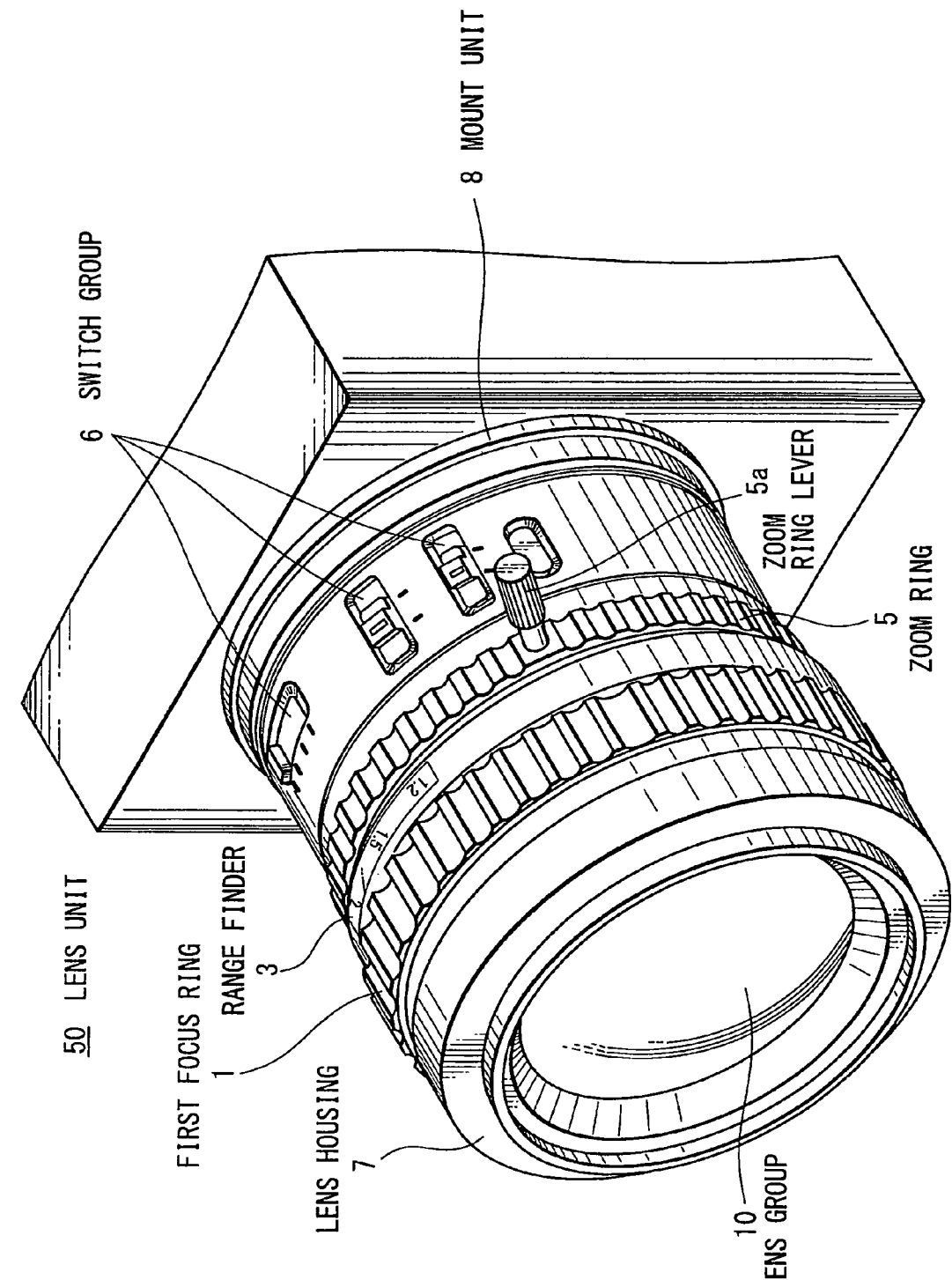
FIG. 1 is a perspective view illustrating an example configuration of a lens device according to an embodiment of the present invention.
Figure 2:
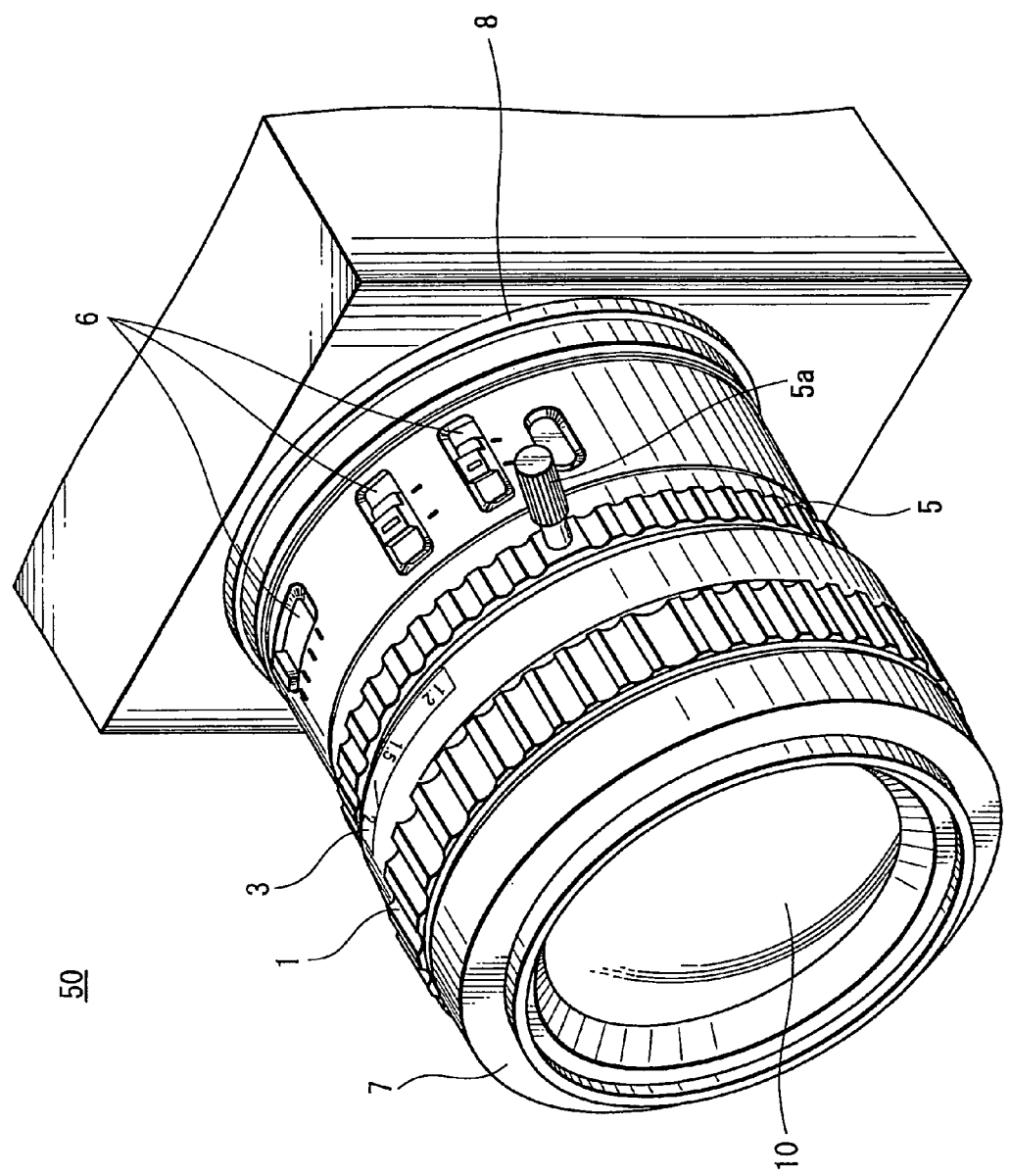
FIG. 2 is a perspective view illustrating an example configuration of a lens device according to an embodiment of the present invention.

The embodiment is applied to a video camera with a manual mode in which an autofocus function can be executed and a full-manual mode in which a focusing operation working with a range finder can be executed. FIGS. 1 and 2 are perspective views showing an example of the appearance of a lens unit in a video camera 100. In this embodiment, a focus ring that drives a focus lens can be switched between two positions, front and rear, in the optical axis direction. FIG. 1 shows a state where a focus ring 1 is located at the front in the optical axis direction, while FIG. 2 shows a state where the focus ring 1 is located at the rear in the optical axis direction.

In FIGS. 1 and 2, a lens unit 50 includes: a lens group 10 including a focus lens (not shown) and the like; a lens housing 7 that holds the lens group 10; a first focus ring 1 that moves the focus lens in the lens group 10 forward and backward along the optical axis; a range finder 3 that measures the distance to a subject; a zoom ring 5 that changes the focal distance of the lens group 10; a zoom-ring lever 5a that helps the rotation of the zoom ring 5; a switch group 6 that changes various settings; and a mount unit 8 that is a portion connected to a main body of the video camera.

The first focus ring 1 is rotated in the clockwise or counterclockwise direction to move the focus lens in the lens group 10 forward or backward along the optical axis. Details of the cooperation between the first focus ring 1 and the lens group 10 will be described later. The first focus ring 1 can be switched between two positions, the front position in the optical axis direction (a first position: the position represented in FIG. 1) and the rear position in the optical axis direction (a second position: the position represented in FIG. 2). The focus lens is moved by working with the range finder 3 when the first focus ring 1 is located at the rear position in the optical axis direction as illustrated in FIG. 2. Details of the internal operation in the lens unit 50 at respective positions of the first focus ring 1 will be described later.

Figure 3:
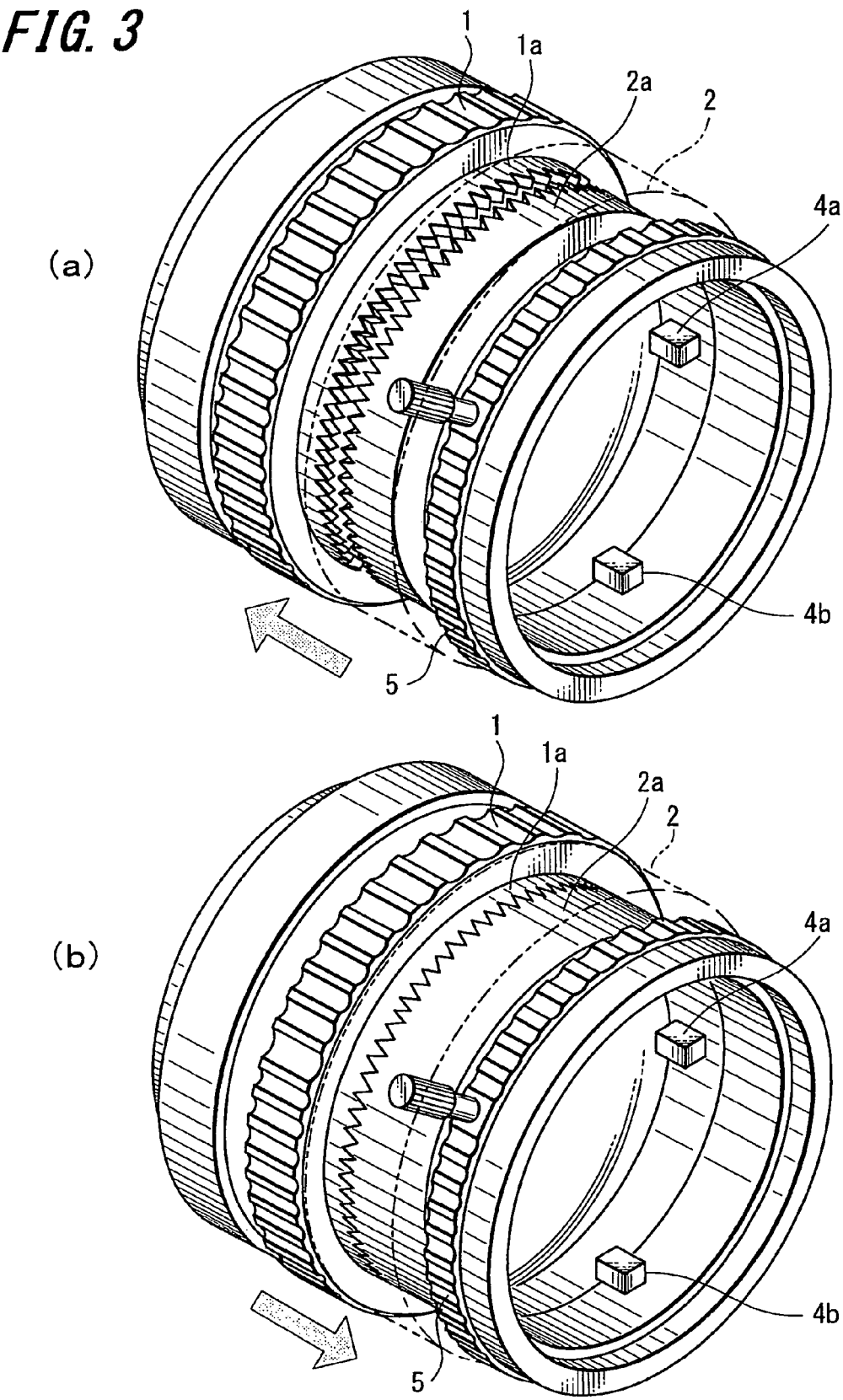
FIG. 3 is a perspective view illustrating an example configuration of a lens device according to an embodiment of the present invention.

The first focus ring 1 is provided with a gear (toothed part) therein and engages with or disengages from a second focus ring 2 similarly provided with a toothed part, forming a clutch mechanism. The clutch is disengaged when the first focus ring 1 moves forward along the optical axis and engaged when moving backward along the optical axis. The clutch mechanism between the first focus ring 1 and the second focus ring 2 will be described with reference to FIG. 3. FIG. 3(a) is a diagram illustrating a disengaged state of the clutch connecting the first focus ring 1 and the second focus ring 2 and FIG. 3(b) is a diagram illustrating an engaged state of the clutch. In FIGS. 3(a) and 3(b), in order to represent in a simplified manner the state of the first focus ring 1 being engaged with or disengaged from the second focus ring 2, the peripheral part of the second focus ring 2 is represented by the dashed line.

FIG. 3(a) illustrates that the first focus ring 1 is moved in the direction shown by the arrow along the optical axis and a toothed part 1a of the focus ring 1 and a toothed part 2a of the second focus ring 2 are separated from each other. When the first focus ring 1 is rotated in this state, a rotation amount thereof can be detected by an encoder 4a provided as a rotation-angle detection unit (first rotation-angle detection unit) and a detection signal is transmitted to a motor described later. Note that, in this embodiment, the encoder (rotary encoder) is used as a rotation-angle detection unit, however, any of other sensors that detect the rotation angle may be alternatively used.

FIG. 3(b) illustrates that the first focus ring 1 is moved in the direction shown by the arrow along the optical axis and the toothed part 1a of the focus ring 1 and the toothed part 2a of the second focus ring 2 are engaged with each other. Since the first focus ring 1 and the second focus ring 2 are engaged with each other, the rotation of the first focus ring 1 allows the second focus ring 2 to work with and to be rotated together.

The both ends of the second focus ring 2 are provided with fixed ends and a rotation angle range thereof may be set to 120 degrees or the like, for example.

Figure 4:
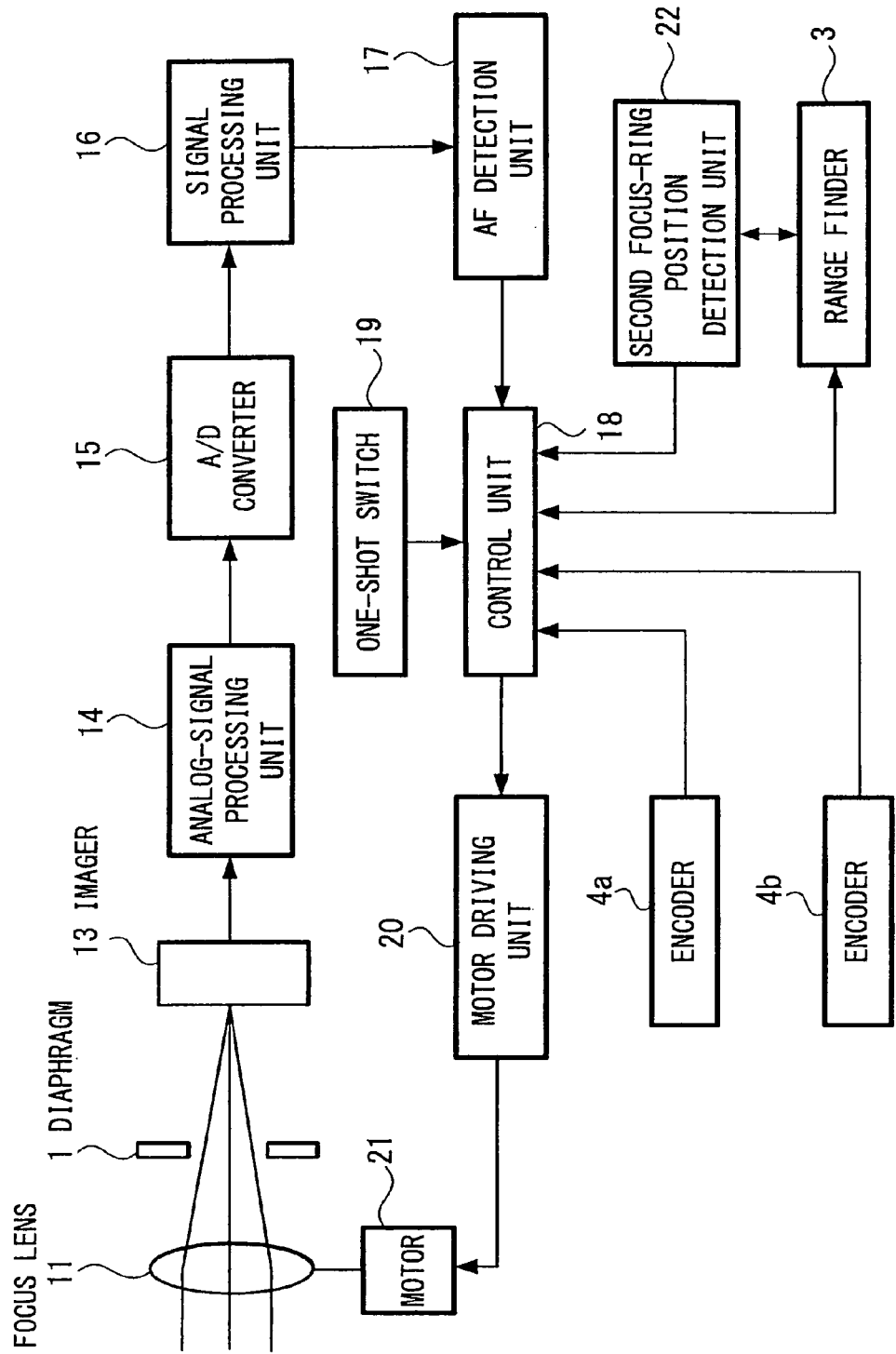
FIG. 4 is a block diagram illustrating an example of internal configuration of a video camera according to an embodiment of the present invention.

Next, an example of internal configuration of the video camera 100 will be described with reference to the block diagram of FIG. 4. In the video camera 100 shown in FIG. 4, an image of a subject is formed on a light-receiving part (not shown) of an imager 13 by a focus lens 11 and photoelectric conversion is carried out at the imager 13 to obtain an imaging signal. Here, an amount of light incident on the imager 13 is controlled by an opening/closing amount of a diaphragm 12. The imaging signal generated at the imager 13 is output to an analog-signal processing unit 14.

The analog-signal processing unit 14 is formed of, for example, a correlated double sampling circuit and an AGC (Automatic Gain Control) circuit (all are not shown in the figure). The correlated double sampling circuit removes reset noise in an image signal input thereto, and the AGC circuit amplifies an image signal input thereto to adjust the signal to a certain signal level. The imaging signal subjected to signal processing in the analog-signal processing unit 14 is supplied to an analog/digital convertor 15 and converted from an analog signal to a digital signal.

The imaging signal converted to the digital signal by the analog/digital convertor 15 is supplied to a signal processing unit 16. In the signal processing unit 16, image signal processing is performed on the imaging signal input thereto to generate an output imaging signal. The image signal processing includes, for example, knee correction which compresses a certain level or more of an imaging signal, gamma correction which corrects a level of an imaging signal according to a gamma curve which has been set, white clip processing and black clip processing, which restrict a signal level of an imaging signal within a predetermined range, and the like. Further, the signal processing unit 16 performs Y/C separation where a luminance signal (Y) and a chrominance signal (C) are separated from a video signal, supplying the separated luminance signal to an autofocus detection unit 17.

The autofocus detection unit 17 calculates an evaluated value corresponding to the contrast of an image by extracting a high frequency component of an imaging signal in a specific region provided in an imaging frame. With respect to a subject in general, an evaluated value increases when focusing comes close to a focal position, and the evaluated value becomes a relative maximum when the focus is at the focal position. The evaluated value calculated at the autofocus detection unit 17 is output to a control unit 18.

The control unit 18 includes, for example, a CPU (Central Processing Unit), a RAM (Random Access Memory), and a ROM (Read Only Memory), and reads out a computer program stored in the ROM to the RAM and executes the program, thereby controlling each part of the video camera 100. Further, the control unit 18 generates a control signal for controlling a motor 21 described later based on the evaluated value input from the autofocus detection unit 17, supplying the control signal to a motor driving unit 20. The motor driving unit 20 is a circuit configured to drive the motor 21. The motor driving unit 20 drives the motor 21 based on the control signal supplied from the control unit 18, and the motor 21 moves the focus lens 11 forward or backward in the optical axis direction. When an imaging operation is carried out using the autofocus function, the focus lens 11 is moved in the optical axis direction under control so that the evaluated value becomes the relative maximum (focus is at the focal position).

Processing in the autofocus detection unit 17 is performed when an autofocus mode is selected by a focus-mode changeover switch (not shown) or when a one-shot switch 19 for operating one-shot automatic focusing is pushed down.

The video camera 100 according to the present embodiment includes: the encoder 4a that detects the rotation of the first focus ring 1 in the clutch-disengaged state as illustrated in FIG. 3(a) and generates a detection signal corresponding to the amount of rotation and an encoder 4b (second rotation-angle detection unit) that detects the rotation of the second focus ring 2 (see FIG. 3) in the clutch-engaged state as illustrated in FIG. 3(b) and generates a detection signal corresponding to the amount of rotation. The detection signal generated at the encoder 4a or 4b is supplied to the control unit 18.

Furthermore, the video camera 100 of the present embodiment includes a second focus-ring position detection unit 22 that detects a position of the second focus ring 2 in the rotation direction. Position information detected by the second focus-ring position detection unit 22 is transmitted to the range finder 3.

The range finder 3 indicates a rotation amount of the second focus ring 2, that is, the focal position corresponding to the moving distance of the focus lens 11. The focusing operation that works with the range finder 3 can be performed when the first focus ring 1 is located at the rear position in the optical axis direction, but the focusing operation may not correspond with the focal position when the first focus ring 1 is located at the front position in the optical axis direction.

In addition, since the second focus ring 2 works with the range finder 3, the focal distance is allowed to correspond with the distance indicated by the range finder 3 when the clutch-disengaged state as shown in FIG. 3(a) is changed to the clutch-engaged state as shown in FIG. 3(b), and, cooperating therewith, the position of the focus lens 11 is shifted under the control of the control unit 18. Therefore, regardless of the distance between the lens and subject image determined in the clutch-disengaged state, the focal distance of the lens can be adjusted to the distance indicated by the range finder 3 when the focus ring 1 is moved backward and coupled to the second focus ring 2.

In contrast, if the clutch-engaged state as shown in FIG. 3(b) is changed to the clutch-disengaged state as shown in FIG. 3(a), the distance between the lens and subject image (the position of the focus lens 11) in the clutch-disengaged state is maintained.

Figure 5:
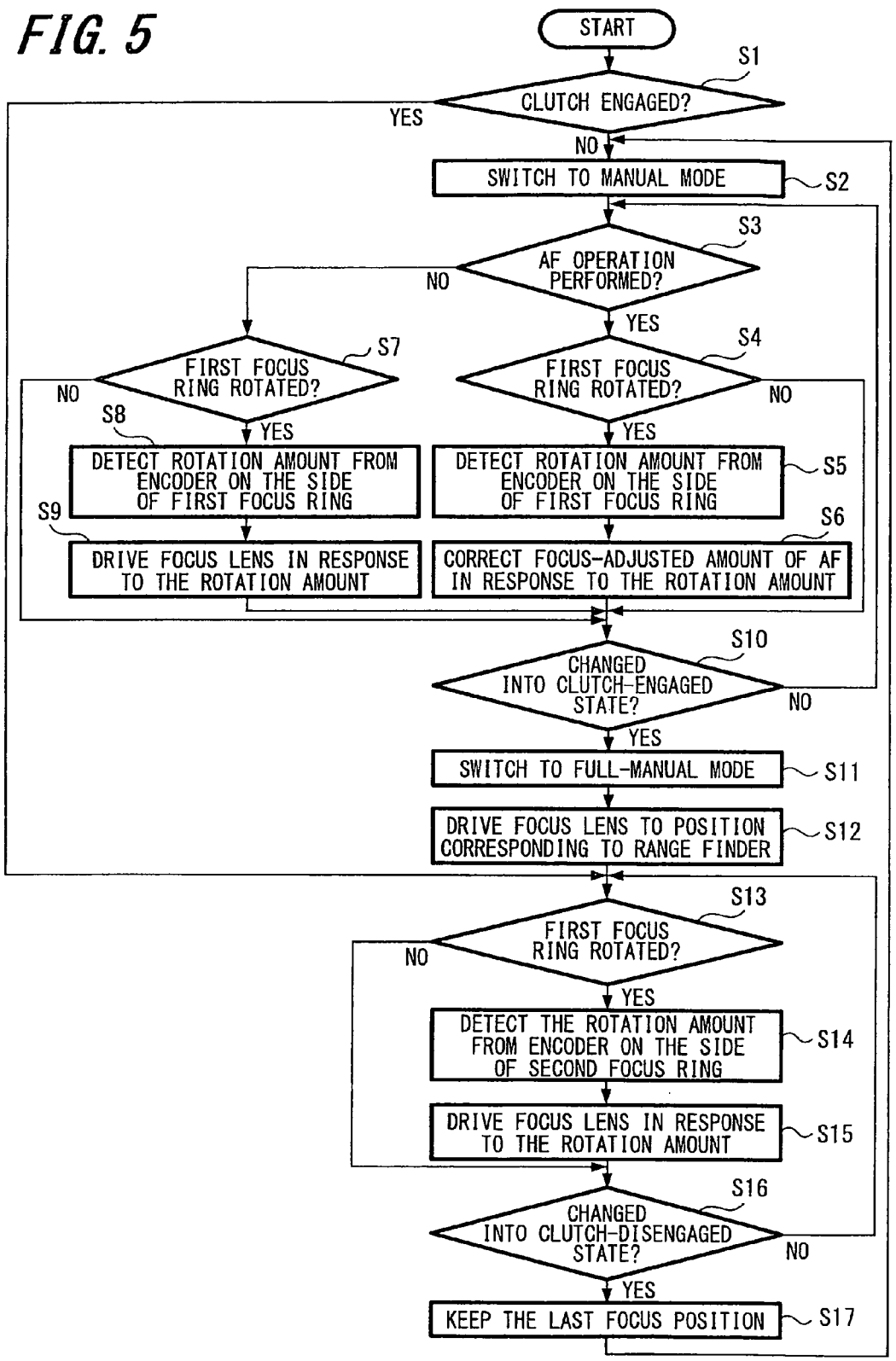
FIG. 5 is a flowchart illustrating an example of processing of switching between a manual mode and a full-manual mode in response to an operation of moving a first focus ring forward and backward in an optical axis direction, according to an embodiment of the present invention.

Next, an example of processing of switching between the manual mode and the full-manual mode in response to the operation of moving the first focus ring 1 forward or backward in the optical axis direction will be described with reference to the flowchart of FIG. 5.

The manual mode is a mode in which the autofocus function can work. In this mode, the focal position can be adjusted manually by rotating the first focus ring 1 after focusing with the autofocus mechanism. The full-manual mode is a mode in which the focusing operation that works with the range finder 3 can be performed and the autofocus function may not work.

The flowchart of FIG. 5 will be described: first, if it is determined that the clutch is engaged when a determination is made whether the clutch is engaged or not, or whether the first focus ring 1 is coupled to the second focus ring 2 or not (Step S1), the processing proceeds to Step S13. When it is determined that there is no engagement, the processing proceeds to the manual mode (Step S2). The presence or absence of clutch engagement is switched by the action of moving the first focus ring 1 forward or backward in the optical axis direction as shown in FIGS. 3(a) and 3(b), where the clutch is disengaged by moving the first focus ring 1 forward and the clutch is engaged by moving it backward.

Next, in the manual mode, it is determined whether the autofocus operation has been carried out or not (Step S3). In a determination whether the autofocus operation, or focusing operation with autofocus mechanism by pressing an one-shot switch down, is carried out or not, if it is determined that the autofocus operation has been carried out, then a determination is made whether the first focus ring 1 has been rotated or not (Step S4). If the rotation of the first focus ring 1 is not confirmed, the processing proceeds to Step S10 described later. If it is determined that the first focus ring 1 has been rotated, then the rotation amount thereof is detected by the encoder 4a on the side of the first focus ring 1 (Step S5). Subsequently, the amount of focus adjustment with the autofocus operation is corrected based on the rotation amount (Step S6).

If it is determined in Step S3 that the autofocus operation has not been carried out, then a determination is made whether the first focus ring 1 has been rotated or not (Step S7); if the rotation of the first focus ring 1 is not confirmed, the processing proceeds to Step S10 described later. If it is determined that the first focus ring 1 has been rotated, then the rotation amount thereof is detected by the encoder 4a on the side of the first focus ring 1 (Step S8). Subsequently, the focus lens 11 is driven in response to the rotation amount (Step S9).

Next, a determination whether the clutch has been changed to the engaged state or not is carried out at Step S10. If it is determined that the clutch is being disengaged, then the processing returns to Step S3 again. If it is determined that the clutch has been changed to the engaged state, then the processing is shifted to the full-manual mode (Step S11).

When the processing enters the full-manual mode, then the focus lens 11 is driven so that the distance between the lens and subject image may correspond to the distance selected by the range finder 3 (Step S12). Next, it is determined whether the first focus ring 1 has been rotated or not (Step S13). If the rotation of the first focus ring 1 is not confirmed, then the processing proceeds to Step S16 described later. If it is determined that the first focus lens 1 has been rotated, then the rotation amount is detected by the encoder 4b on the side of the second focus ring 2 (Step S14) and the focus lens 11 is driven based on the detected rotation amount (Step S15).

Next, a determination whether the clutch is changed to the disengaged state or not is carried out (Step S16). If it is determined that the change has occurred, the processing proceeds to Step S2 while the focusing position at that moment is held (Step S17). In other words, the processing enters the manual mode while the final focusing position being kept. If it is determined that there is no change in the clutch state at Step S16 (remaining in the engaged state), then the processing returns to Step S13.

As described above, since the first focus ring 1 is configured to be movable forward and backward in the optical axis direction and the first focus ring 1 is allowed to work with the range finder 3 by moving the first focus ring 1 backward, the focusing operation working with the range finder 3 can be carried out by switching the position of the first focus ring 1.

Therefore, when the distance to the subject has been determined, the first focus ring 1 is moved backward in the optical axis so as to carry out the focusing operation working with the range finder 3. In other words, since there is no need to confirm the focused state through a finder, the focusing can be performed more quickly.

In addition, moving the first focus ring 1 backward in the optical axis direction allows a focal point to be automatically adjusted to the distance selected by the range finder 3, and therefore, in the full-manual mode, if it is desired for the focus to be fit to 3 m or the like from the state in which the focus is infinity, the focusing can be performed more quickly than endlessly rotating the first focus ring 1.

Furthermore, in the manual focusing operation, two different operations, one for rotating the first focus ring 1 without any fixed end and the other for rotating the first focus ring 1 with the fixed ends in the state of working with the range finder 3, can be performed, and therefore, an imaging can be performed in response to the conditions of the subject on a case-by-case basis.

Note that, the embodiment described so far is the example applied to the video camera; alternatively, it may be a video camera with an imaging unit integrated with a recording unit or other devices with the same functions as those of the video camera, and therefore, it is applicable to various kinds of devices. The lens unit may be removable from the video camera, allowing the lens unit to be replaceable.

EXPLANATION OF REFERENCE NUMERALS 1 first focus ring, 1a toothed part, 2 second focus ring, 2a toothed part, 2 range finder, 4, 4a, 4b encoders, 5 zoom ring, 5a zoom ring lever, 6 switch group, 7 lens housing, 8 mount unit, 10 lens group, 11 focus lens, 12 diaphragm, 13 imager, 14 analog-signal processing unit, 15 analog/digital convertor, 16 signal processing unit, 17 autofocus detection unit, 18 control unit, 19 one-shot switch, 20 motor driving unit, 21 motor, 22 second focus-ring position detection unit.

The invention claimed is:

1. A lens device mountable on an imaging device, characterized by comprising:
    a focus lens;
    a first focus ring movable between a first position and a second position on an optical axis, having an unlimited rotation range when being located at the first position;
    a first rotation-angle detection unit that detects a rotation amount of the first focus ring at the first position;
    a second focus ring coupled to the first focus ring when the first focus ring is located at the second position, having a limited rotation range corresponding to an adjustable range of the focus lens;
    a second rotation-angle detection unit that detects a rotation amount of the second focus ring;
    a control unit that outputs to the imaging device at least information about the rotation amount detected by the first rotation-angle detection unit when the first focus ring is located at the first position and outputs to the imaging device at least information about the rotation amount detected by the second rotation-angle detection unit when the first focus ring is located at the second position.

2. An imaging device characterized by comprising:
    an input unit that inputs information about a first rotation amount and information about a second rotation amount from a lens device that includes
        a focus lens,
        a driving unit that drives the focus lens,
        a first focus ring movable between a first position and a second position on an optical axis, having an unlimited rotation range when being located at the first position,
        a first rotation-angle detection unit that detects a rotation amount of the first focus ring at the first position,
        a second focus ring coupled to the first focus ring when the first focus ring is located at the second position, having a limited rotation range corresponding to an adjustable range of the focus lens,
        a second rotation-angle detection unit that detects a rotation amount of the second focus ring, and
        a first control unit that outputs at least information about the first rotation amount detected by the first rotation-angle detection unit when the first focus ring is located at the first position and outputs at least information about the second rotation amount detected by the second rotation-angle detection unit when the first focus ring is located at the second position; and
    a second control unit that generates control signals in response to the information about the first rotation amount and the information about the second rotation amount being input to the input unit and outputs the control signals to the driving unit of the lens.

3. The imaging device according to claim 2, characterized in that:
    when the first focus ring is located at the first position, a manual focus adjustment can be carried out by rotating the first focus ring while an autofocus adjustment is carried out based on detection of a focused state of the focus lens; and
    when the first focus ring is located at the second position, a manual focus adjustment can be carried out by rotating the first and second focus rings.

4. The imaging device according to claim 2, characterized in that:
    when the position of the first focus ring is changed from the first position to the second position, the position of the first focus lens is set to the last adjusted position of the focus lens corresponding to a previous second position.

5. The imaging device according to claim 2, characterized in that:
    when the first focus ring is located at the second position, the first focus ring works with a range finder that indicates the position of the focus lens.

6. An imaging device characterized by comprising:
    a focus lens;
    a driving unit that drives the focus lens;
    a first focus ring movable between a first position and a second position on an optical axis, having an unlimited rotation range when being located at the first position;
    a first rotation-angle detection unit that detects a rotation amount of the first focus ring at the first position;
    a second focus ring coupled to the first focus ring when the first focus ring is located at the second position, having a limited rotation range corresponding to an adjustable range of the focus lens;
    a second rotation-angle detection unit that detects a rotation amount of the second focus ring; and
    a control unit that generates a control signal based on the rotation amount detected by the first rotation-angle detection unit and supplies the signal to the driving unit when the first focus ring is located at the first position and generates a control signal based on the rotation amount detected by the second rotation-angle detection unit and supplies the signal to the driving unit when the first focus ring is located at the second position.

7. The imaging device according to claim 6, characterized in that:
    when the first focus ring is located at the first position, a manual focus adjustment can be carried out by rotating the first focus ring while an autofocus adjustment is carried out based on detection of a focused state of the focus lens; and,
    when the first focus ring is located at the second position, a manual focus adjustment can be carried out by rotating the first and second focus rings.

8. The imaging device according to claim 6, characterized in that:

when the position of the first focus ring is changed from the first position to the second position, the position of the first focus lens is set to the last adjusted position of the focus lens corresponding to a previous second position.

9. The imaging device according to claim 6, characterized in that:

when the first focus ring is located at the second position, the first focus ring works with a range finder that indicates the position of the focus lens.

10. The imaging device according to claim 6, further comprising:

an autofocus detection unit that calculates an evaluated value using a high-frequency component of a specific range of an image signal captured by an imaging unit, characterized in that the control unit generates a control signal in response to the evaluated value calculated by the autofocus detection unit when the first focus ring is located at the first position and supplies the control signal to the driving unit to carry out autofocus control based on the evaluated value.

* * * * *